No. 608,066. Patented July 26, 1898.
G. O. MORSE & E. D. RICH.
PIPE CUTTER.
(Application filed Nov. 10, 1897.)
(No Model.) 2 Sheets—Sheet 1.
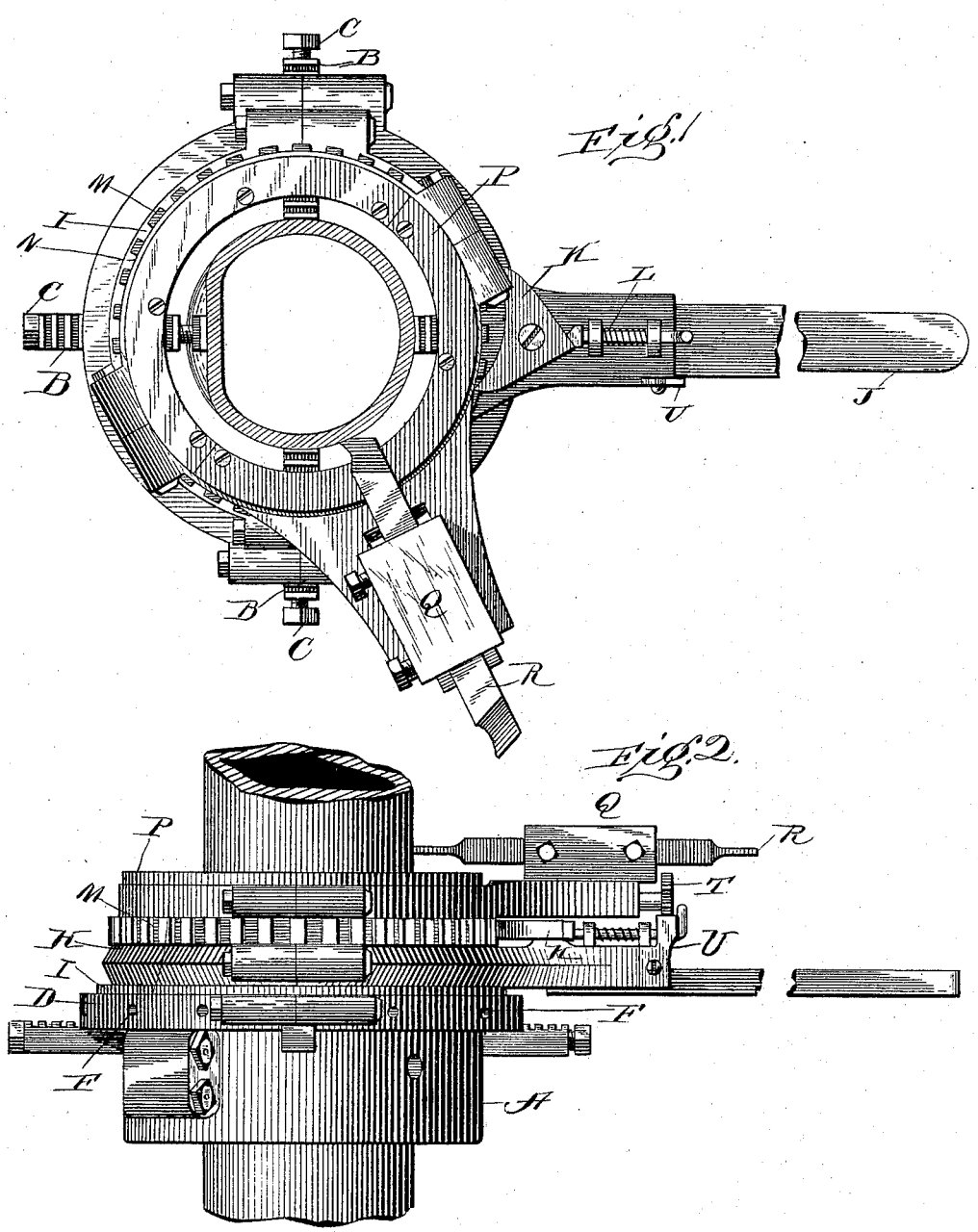

No. 608,066. Patented July 26, 1898.
G. O. MORSE & E. D. RICH.
PIPE CUTTER.
(Application filed Nov. 10, 1897.)
(No Model.) 2 Sheets—Sheet 2.
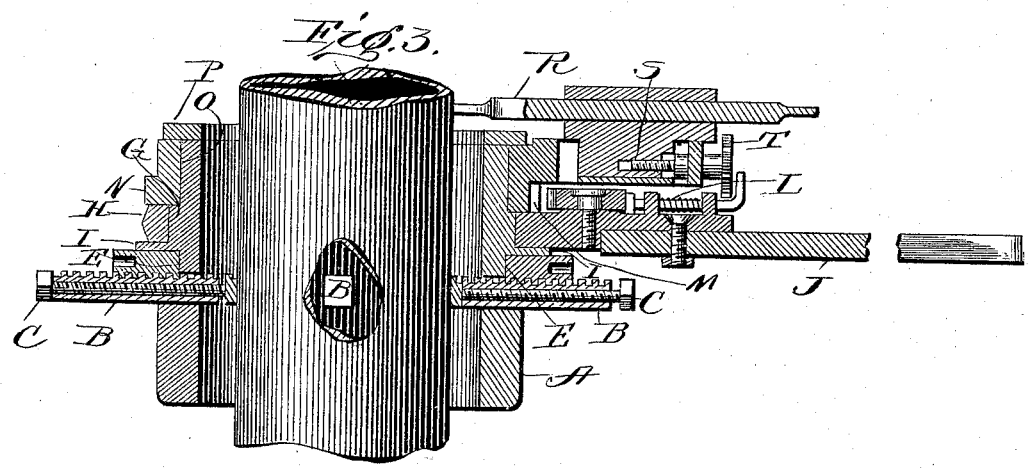
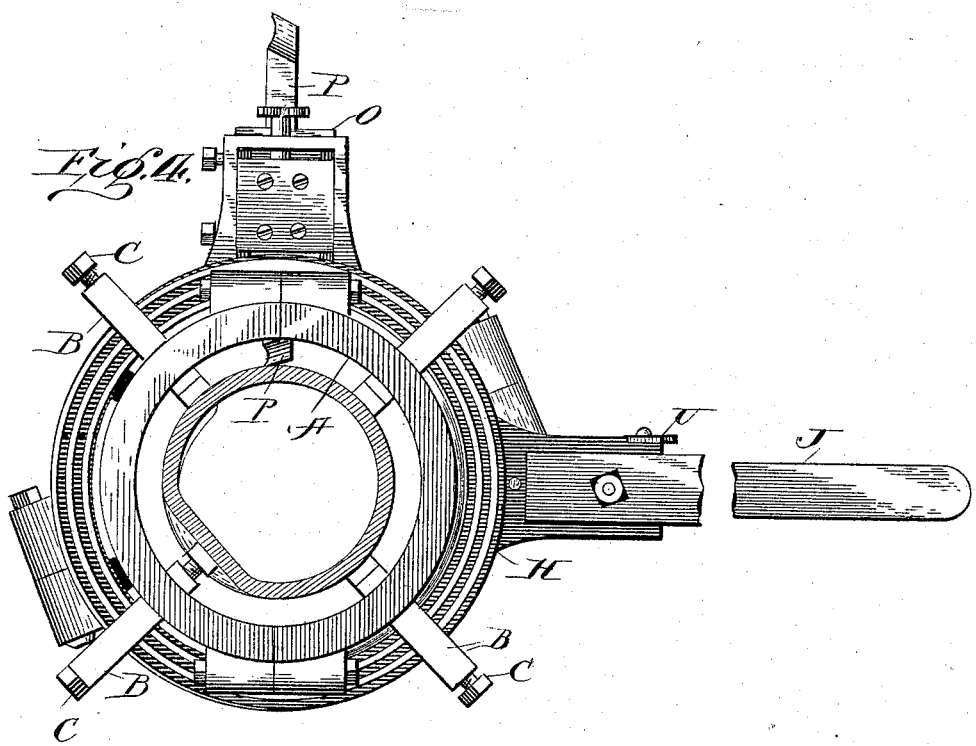

UNITED STATES PATENT OFFICE.

GUY O. MORSE AND ELIJAH D. RICH, OF MAQUOKETA, IOWA.

PIPE-CUTTER.

SPECIFICATION forming part of Letters Patent No. 608,066, dated July 26, 1898.

Application filed November 10, 1897. Serial No. 658,072. (No model.)

*To all whom it may concern:*

Be it known that we, GUY O. MORSE and ELIJAH D. RICH, citizens of the United States of America, residing at Maquoketa, in the county of Jackson and State of Iowa, have invented certain new and useful Improvements in Pipe-Cutters, of which the following is a specification.

This invention relates to hand tools or devices for transversely severing or dividing pipes and bolts.

The object of this invention is to provide a pipe-cutter which can be readily applied to a pipe and operated conveniently in any position.

Another object of this invention is to provide a pipe-cutter which is cheap and simple in its construction and one that may be quickly and easily adjusted to fit pipes of different sizes.

With these objects in view our invention consists in the particular construction of the various parts and in the novel manner or arrangement of said parts, all of which will be described hereinafter and pointed out in the claims.

In the drawings forming part of this specification, Figure 1 is a top plan view. Fig. 2 is a side elevation. Fig. 3 is a central cross-section. Fig. 4 is a bottom plan view.

Referring to the drawings, A represents the stock of the implement, consisting of a ring or band made in two parts and held together by means of removable bolts passing through the lugs formed thereon. Seated within the stock are four clamping-jaws B, having set-screws C mounted longitudinally therein and provided with ratchet-teeth on one side, which engage the scroll upon the face of the divided ring D, mounted in the slot E and held together by removable bolts passing through the lugs, as shown. The exterior or outer face of this ring is provided with recesses F, adapted to be engaged by the wrench to be operated by the same, and in turning the said ring upon its bearing the jaws are made to move in unison and to clamp or unclamp the pipe held therein, as may be desired.

The object of the set-screws mounted in the jaws is to afford means whereby pipes or bars which are rough and irregular on their periphery may be clamped on all the jaws with the same tension and also to afford means for fitting and adjusting the device upon the pipe or bolt.

A guide-flange I, interposed between the ring D and the ring H, which is mounted upon the drum G and which is also a divided ring held together by removable bolts passing through the lugs formed thereon, prevents friction between the said rings, and thus avoids the possibility of displacing one while adjusting the other.

One part or section of the ring H is somewhat enlarged and adapted to receive a detachable handle J for operating the device. Mounted upon the said enlarged section is a reversible pawl K, held in engagement by the spring and catch L with the ratchet-teeth M upon the divided ring N, which is held together in a similar manner as the rings D and H and is mounted upon the drum O and held thereon by the collar P, secured to the face of the stock.

The ring N projects over or upon the ring H and is provided with an enlarged section, upon which is mounted the stock Q, carrying a cutting-bit R, operated by the feed-screw S, which is provided with a notch-wheel T, adapted to engage the lug U upon the enlarged portion of the ring H when the said ring is rotated.

From the foregoing description, taken in connection with the drawings, the operation of our device will be obvious, and further description is deemed unnecessary.

Having thus described our invention, what we claim as new, and desire to secure by Letters Patent, is—

1. In an improved pipe-cutter consisting in a combination of parts, of a two-part stock held together by removable bolts passing through the lugs formed thereon, clamping-jaws seated in the said stock having ratchet-teeth upon one side thereof and set-screws mounted longitudinally therein, the said jaws adapted to be operated by the scroll upon the divided ring mounted in the groove upon the stock, the said ring having recesses upon its periphery, adapted to be engaged by a wrench to be operated by the same, substantially as shown and described.

2. In an improved pipe-cutter consisting of a combination of parts, a stock formed in two parts, said parts held together by removable bolts passing through lugs, clamping-jaws seated within the said stock having ratchet-teeth on one side thereof and set-screws journaled longitudinally therein, the said jaws operated by a scroll upon one face of the divided ring mounted in a slot or groove upon the stock, and held together by removable bolts passing through lugs thereon, the said ring having recesses on its periphery adapted to be engaged by a wrench to be operated by the same, a second ring mounted upon the stock, formed in two parts or sections, one section being somewhat enlarged and adapted to receive a detachable handle, a reversible pawl mounted upon the said enlarged portion adapted to be held in adjusted position by a spring and catch, substantially as shown and described.

3. In an improved pipe-cutter the combination of a two-part stock having clamping-jaws seated therein, said jaws provided with ratchet-teeth on one side, and a set-screw journaled longitudinally therein, a divided ring mounted upon the said stock having a scroll on one face adapted to engage the ratchet-teeth upon the jaws, and recesses upon its periphery, a second ring mounted upon the stock comprising two parts or sections, one section being somewhat enlarged and adapted to receive a detachable handle, a reversible pawl adapted to be held in adjusted position by a spring and catch, and a lug mounted upon the said enlarged portion, a flange interposed between the ring operating the jaws, and the ring supporting the handle, a third ring mounted upon the stock, bearing against the handled supporting-ring, and held thereon by a collar, the said ring being divided, and provided upon its periphery with ratchet-teeth adapted to engage the reversible pawl, having one section enlarged, the said enlarged section carrying the stock and feed mechanism, substantially as shown and for the purpose set forth.

GUY O. MORSE.
ELIJAH D. RICH.

Witnesses:
FRED FISCHER,
S. B. SEARS.